April 14, 1925.  G. D. B. BONBRIGHT  1,533,092

FISHHOOK

Filed March 16, 1922

INVENTOR.
George D.B. Bonbright.
BY
HIS ATTORNEY.

Patented Apr. 14, 1925.

1,533,092

UNITED STATES PATENT OFFICE.

GEORGE D. B. BONBRIGHT, OF ROCHESTER, NEW YORK.

FISHHOOK.

Application filed March 16, 1922. Serial No. 544,267.

*To all whom it may concern:*

Be it known that I, GEORGE D. B. BONBRIGHT, a citizen of the United States of America, and resident of Rochester, in the county of Monroe and State of New York, have invented certain new and useful Improvements in Fishhooks; and I do hereby declare the following to be a full, clear, and exact description of the same, reference being had to the accompanying drawings, forming a part of this specification, and to the reference numerals marked thereon.

My present invention relates to improvements in fish hooks, and has for its object to provide a hook particularly adapted for use in angling for large game fish, and in which the bait used is of considerable size and liable to be displaced when the fish strikes. To this end the invention consists in the provision of a hook embodying in addition to the ordinary barbed lower portion for securing the fish, an additional bait-holding prong or hook located above the latter and formed integrally with the shank of the hook near the attaching end, the construction and arrangement of the hook being such that it may be readily manufactured from a single piece of material.

In the accompanying drawings.

Similar reference numerals throughout the several views indicate the same parts.

Figure 1:
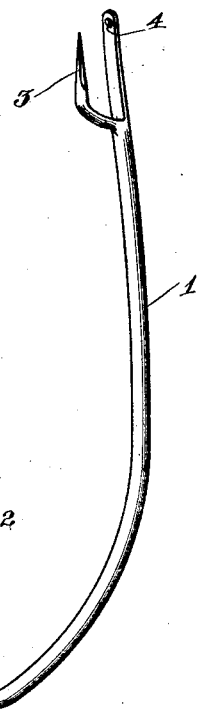
Figure 1 is a perspective view of a hook embodying my improvement.
Figure 2:
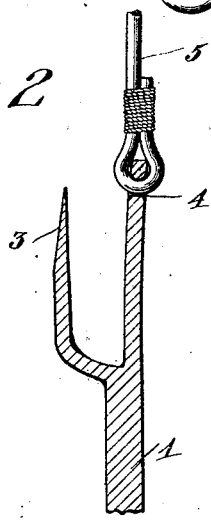
Figure 2 is a longitudinal section of the upper portion or attaching end of the shank.

As shown in the drawing, the device is formed of a single piece of metal cut from round steel, the lower end of which is pointed and cut at one side to form a barb 2 and then bent into the usual form. The upper portion of the shank 1 is split longitudinally from the extreme end downward a short distance at one side, and the narrower portion is bent outwardly from the shank and projects upwardly substantially parallel with the upper end to form an auxiliary hook or bait-holding prong 3, the upper end of which is sharpened. The lower portion of this auxiliary hook where it joins the shank is rounded somewhat as shown and the pointed end extends substantially parallel with the shank so that the crotch between the two will be somewhat rounded rather than V shaped, this construction serving to more efficiently retain the bait and to assist in retaining it in position when, for instance, a fish strikes at the lower end of the hook. The extreme end of the shank is provided with a line engaging means such as the aperture 4 through which the wire or line 5 is passed and secured in any usual or preferred manner. The function of the auxiliary prong or hook 3 is to engage the bait which is impaled upon it, as well as upon the lower or main hook, so that the bait is always held in proper position upon the main or lower hook and will not become detached.

The hook described is not only efficient for properly securing the bait and preventing its detachment even when a fish does not fully take the hook, but being constructed of a single piece of steel wire, afterwards tempered as usual, it is strong and not liable to be broken even if the fish should take the whole hook in its mouth.

The preferred manner of making the hook is to take a single piece of round steel wire sharpened at one end, then the barb is formed in the usual way by slitting the sharpened end at one side, then the upper end of the shank is split in any suitable way, the bait prong 3 sharpened and the extreme end of the shank bored to form the line attaching aperture 4 after which the hook is bent into the desired form and tempered in the usual manner. It is not of course necessary that the steps of manufacture be performed in the order stated, as they may be varied as required or to suit the particular method used by the manufacturer. The construction is such that a strong hook composed of a single piece of steel may be readily formed and no soldering, brazing or connecting operations are required as heretofore.

I claim as my invention:

As an article of manufacture a fish hook consisting of a single piece of material and comprising a shank having at its lower end a barbed hook and its upper portion split in two parts, one having an attaching eye at the end in alinement with the shank and the other part bent outwardly and extended substantially parallel with the first mentioned part and having its end sharpened to constitute a barbless bait impaling prong.

GEORGE D. B. BONBRIGHT.